(12) United States Patent
Amonou et al.

(10) Patent No.: US 7,254,830 B2
(45) Date of Patent: Aug. 7, 2007

(54) INSERTION OF MESSAGES IN DIGITAL DATA

(75) Inventors: Isabelle Amonou, Thorigne-Fouillard (FR); Ioana Donescu, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1207 days.

(21) Appl. No.: 09/990,268

(22) Filed: Nov. 23, 2001

(65) Prior Publication Data

US 2002/0066019 A1    May 30, 2002

(30) Foreign Application Priority Data

Nov. 27, 2000    (FR) .................................. 00 15271

(51) Int. Cl.
  *G06F 12/00* (2006.01)
  *G06F 17/30* (2006.01)
(52) U.S. Cl. ................................. 726/5; 726/3; 726/18
(58) Field of Classification Search .................... 726/6, 726/10, 18, 21, 5, 3; 713/176
  See application file for complete search history.

(56) References Cited

U.S. PATENT DOCUMENTS 6,192,138 B1    2/2001  Yamadaji

FOREIGN PATENT DOCUMENTS

| EP | 0 766 468 A2 | 4/1997 |
| EP | 0 840 513 A2 | 5/1998 |
| EP | 1 018 833 A2 | 7/2000 |
| EP | 1 043 687 A1 | 10/2000 |
| JP | 10-308943    | 11/1998 |

OTHER PUBLICATIONS

Capacity of full frame DCT image watermarks Barni, M.; Bartolini, F.; De Rosa, A.; Piva, A.; Image Processing, IEEE Transactions on vol. 9, Issue 8, Aug. 2000 pp. 1450-1455.*
M. Barni, F. Bartolini, A. De Rosa, and A. Piva, Capacity of the watermark channel: how many bits can be hidden within a digital image? Proc. SPIE, vol. 3657, pp. 437-448, San Jose, CA, Jan. 1999.*
Scalar Costa scheme for information embedding Eggers, J.J.; Bauml, R.; Tzschoppe, R.; Girod, B.; Signal Processing, IEEE Transactions on [see also Acoustics, Speech, and Signal Processing, IEEE Transactions on] vol. 51, Issue 4, Apr. 2003 pp. 1003-1019.*
A Reversible Watermarking Scheme for JPEG-2000 Compressed Images Emmanuel, S.; Heng Chee Kiang; Das, A.; Multimedia and Expo, 2005. ICME 2005. IEEE International Conference on Jul. 6-8, 2005 pp. 69-72.*

(Continued)

*Primary Examiner*—David Jung
(74) *Attorney, Agent, or Firm*—Fitzpatrick, Cella, Harper & Scinto

(57) ABSTRACT

The invention proposes a method of inserting a message in a subset (VO) of digital data representing physical quantities, characterized in that it includes the steps of:
  estimating (E4) a capacity to receive a message for said subset,
  selecting (E5) a message with a size less than or equal to the estimated capacity, in a set of a messages,
  inserting (E6) the selected message in the said subset of digital data.

Figure 1:
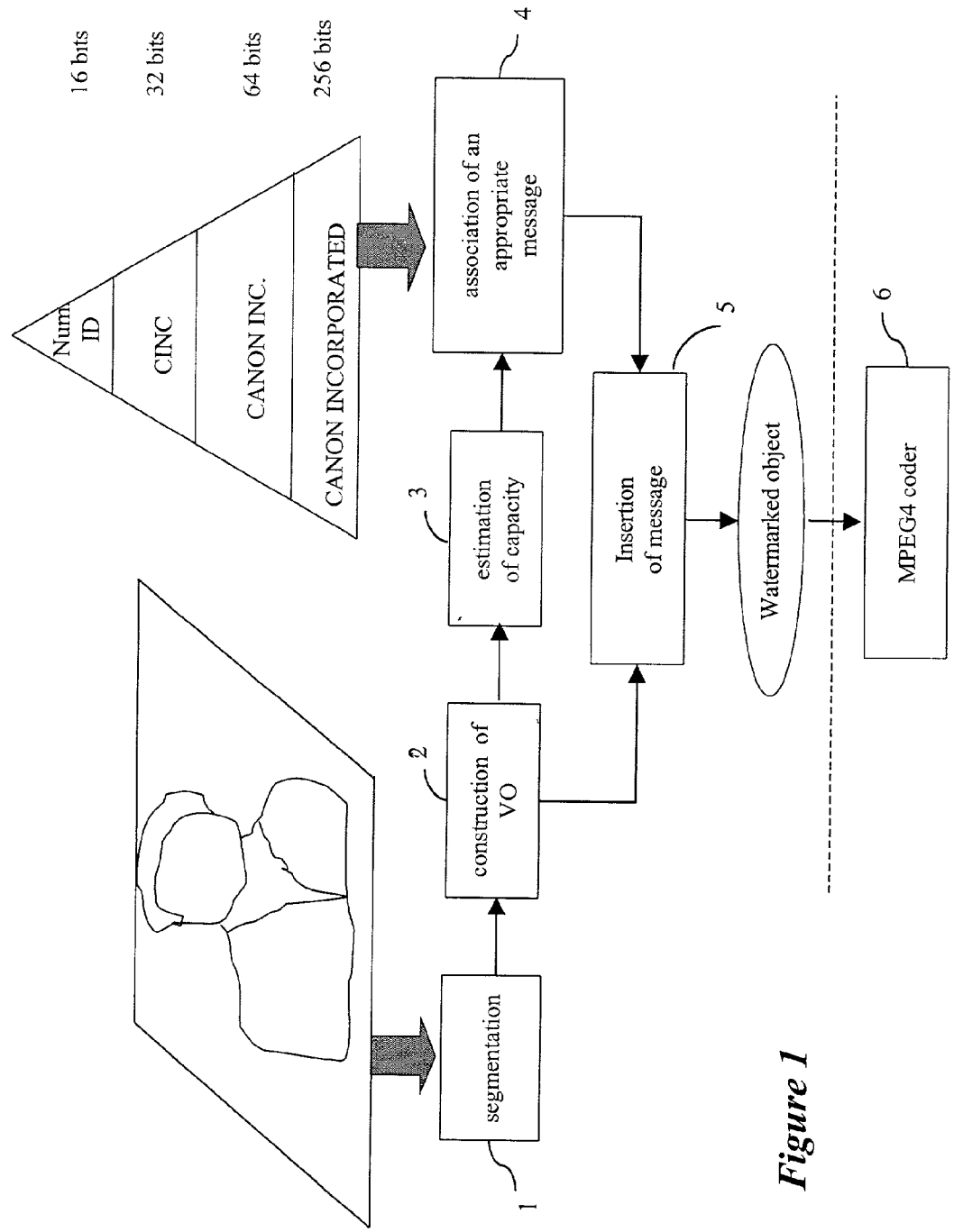

The invention applies particularly to an object in a digital image.

33 Claims, 16 Drawing Sheets

OTHER PUBLICATIONS

Lossless generalized-LSB data embedding Celik, M.U.; Sharma, G.; Tekalp, A.M.; Saber, E.; Image Processing, IEEE Transactions on vol. 14, Issue 2, Feb. 2005 pp. 253-266.*

G. Kim, et al. "An Object-Based Video Watermarking", IEEE, 1999, pp. 100-101.

J. Zhao, "Embedding Robust Labels Into Images For Copyright Protection", In: Proc. of the Int. Congress on Intellectual Property Rights for Specialized Information, Knowledge and New Technologies, Vienna, Aug. 1995, pp. 1-10.

Phillipe Salembier, "Morphological multiscale segmentation for image coding" *Signal Processing*, European Association for Signal Processing (EURASIP), vol. 38, No. 3, Aug. 1994, pp. 359-386.

* cited by examiner

| C1 | C2 | C3 | BIT |
|----|----|----|-----|
| H | M | L | |
| M | H | L | 1 |
| H | H | L | |
| M | L | H | |
| L | M | H | 0 |
| L | L | H | |
| H | L | M | |
| L | H | M | NEUTRAL |
| M | M | M | |

INSERTION OF MESSAGES IN DIGITAL DATA

The present invention concerns a method and device for inserting a message such as a secret watermark in a digital signal.

The digital signal considered hereinafter will more particularly be a digital image signal.

The insertion method according to the invention lies within the technical field of the watermarking of digital data, which can be interpreted as the insertion of a stamp in the digital data, making it possible for example to authenticate the content of a digital data file. This watermarking is also referred to as digital tattooing.

Watermarking includes in general terms the modification of coefficients representing the digital image. This modification is imperceptible to the eye, but can be coded by an appropriate decoder.

The capacity of the digital image is considered, that is to say the number of watermarking bits which it is possible to insert therein. The capacity is determined according to the invisibility of the message and the robustness of the insertion. The robustness is defined by the possibility of finding the inserted message even after subsequent processing steps, such as compression for example.

Moreover, object oriented coding systems are known which process the images by objects. An object is obtained by segmentation of the image, and is an entity of the image, frequently a semantic entity. A priori, an object has any size and form.

By way of example, the MPEG4 standard allows such a processing of an image by object.

The advantages of these systems are well known. With regard to a supplementary message or item of information associated with an image, the MPEG4 standard provides for example for an information field associated with each object. This is a supplementary field here.

No message insertion method is specifically adapted to the processing of an image by objects. In fact the insertion of a message in an object of an image poses specific problems. In particular, the capacity of the object is not known a priori. If a message is inserted in an object without taking account of this capacity, the invisibility of the inserted message and the robustness of insertion will then no longer be guaranteed, since the compromise between capacity, invisibility and robustness will not necessarily be complied with.

The present invention aims to remedy the drawbacks of the prior art, by providing a method and device which make it possible to insert a message in a subset of digital data whilst ensuring the required robustness and invisibility.

To this end, the invention proposes a method of inserting a message in a subset of digital data representing physical quantities, characterized in that it includes the steps of:
  estimating a capacity to receive a message for said subset,
  selecting a message with a size less than or equal to the estimated capacity, in a set of messages,
  inserting the selected message in the said subset of digital data.

Correlatively, the invention proposes a device for inserting a message in a subset of digital data representing physical quantities, characterized in that it has:
  means of estimating a capacity to receive a message for said subset,
  means of selecting a message with a size less than or equal to the estimated capacity, in a set of messages,
  means of inserting the selected message in the said subset of digital data.

The present invention makes it possible to ensure the invisibility and robustness of the message inserted in the subset. In fact, through the selection of a message of adapted size, the invention makes it possible to comply with the compromise between the capacity of the subset, the invisibility of the inserted message and the robustness of the insertion.

According to a preferred characteristic, the method includes a prior step of producing the set of messages, said messages having different sizes.

Thus, messages are available prior to the insertion and it is possible to choose one of them according to its size.

According to a preferred characteristic, each message with a size which is not the largest in the set of messages is deducible from another message with a larger size and included in the set of messages.

The messages thus have the same signification, but different sizes.

According to a preferred characteristic, the message is selected so that its size is just less than or equal to the estimated capacity for said subset of digital data.

The selected message is consequently the largest possible according to the capacity of the subset.

According to a preferred characteristic, said subset of digital data is arbitrary in form.

According to a preferred characteristic, said subset of digital data corresponds to an object characterizing a semantic entity of the set of digital data.

The subset is for example an object, in particular of a digital image. However, the invention applies to any type of digital data.

According to a preferred characteristic, the insertion method also includes the prior steps of:
  segmenting the digital data into regions,
  selecting at least one region in order to constitute said subset.

The object formation can be integrated into the method according to the invention.

According to a preferred characteristic, the insertion of the message includes, for each element of the message, the choice of coefficients in said subset and the modulation of the element on the values of the chosen coefficients.

According to a preferred characteristic, the estimation of the capacity includes the calculation of the minimum number of coefficients necessary for inserting a message element so as to be able to detect this element with a predetermined probability of correct detection.

According to a particular embodiment, the insertion method includes the steps of:
  segmenting the subset into blocks,
  transforming the blocks by means of a reversible transformation, prior to the insertion step,
  and the insertion step proper includes the steps of:
    selecting a group of coefficients in a transformed block, for an element of the message to be inserted,
    coding the element to be inserted according to the relative values of the coefficients of the selected group.

In this particular embodiment, the estimation of the capacity includes the search for the number of groups which can be used according to a predetermined rule.

The insertion device has means of implementing the previously presented characteristics, and offers similar advantages.

The invention also concerns a method of extracting a message inserted by the previously presented method, in a subset of digital data representing physical quantities, characterized in that it includes steps of:
- extracting the message,
- comparing the extracted message with messages stored in memory,
- identifying the fact that the extracted message belongs to a set of stored messages.

The invention concerns an extraction device having means of implementing the above characteristics.

The extraction method and device have advantages similar to those previously described.

The invention also concerns a digital apparatus including the device according to the invention, or means of implementing the method according to the invention. This digital apparatus is for example a digital photographic apparatus, a digital camcorder or a scanner. The advantages of the device and of the digital apparatus are identical to those previously disclosed.

The invention can be implemented by means of a computer program. The invention also concerns a computer program on a storage medium and comprising computer executable instructions for causing a computer to insert or to extract a message according to the previously disclosed methods.

The invention also concerns an information storage means, which can be read by a computer or by a microprocessor, integrated or not into the device, possibly removable, storing the program implementing the method according to the invention.

Figure 2:
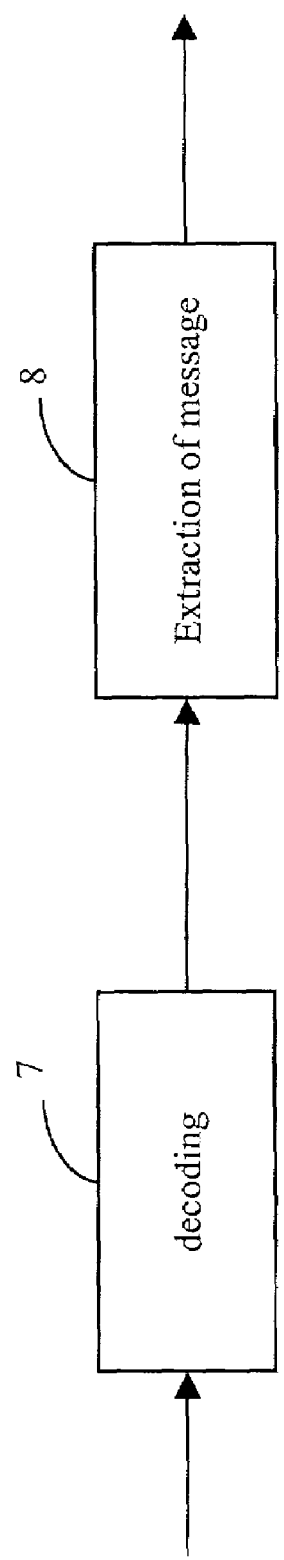
Figure 3:
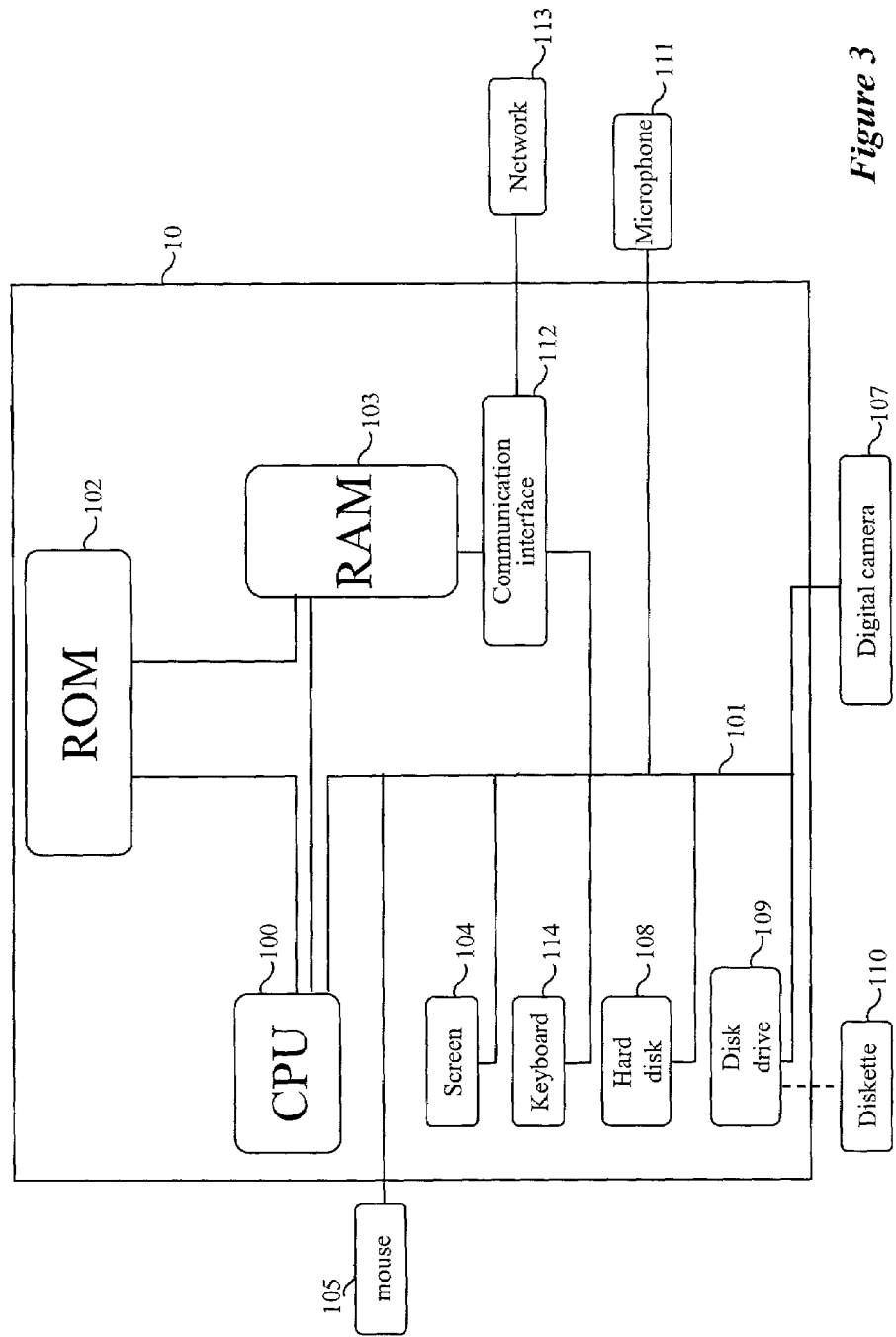
Figure 4:
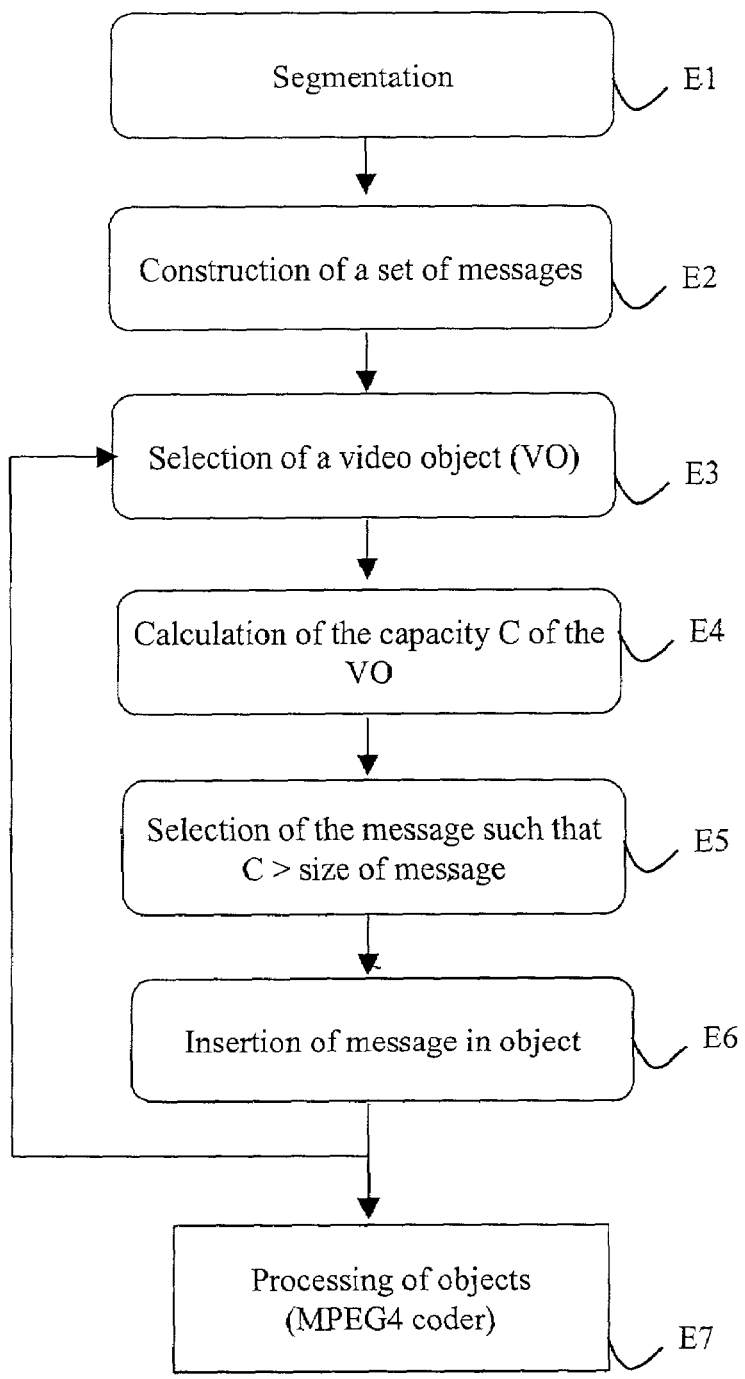
Figure 5:
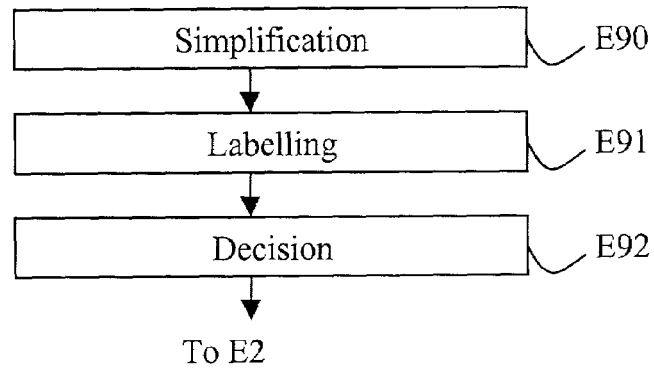
Figure 6A:
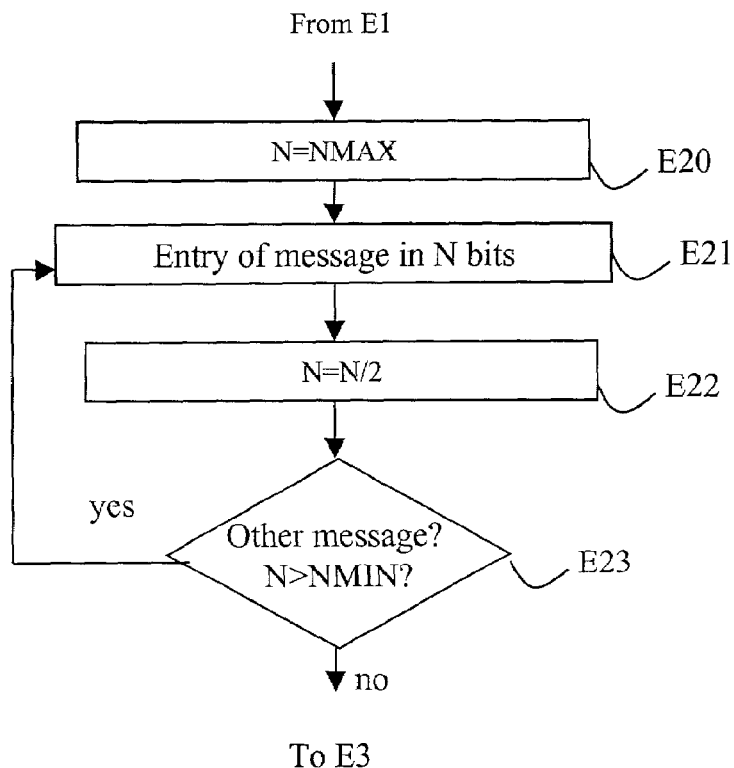
Figure 6B:
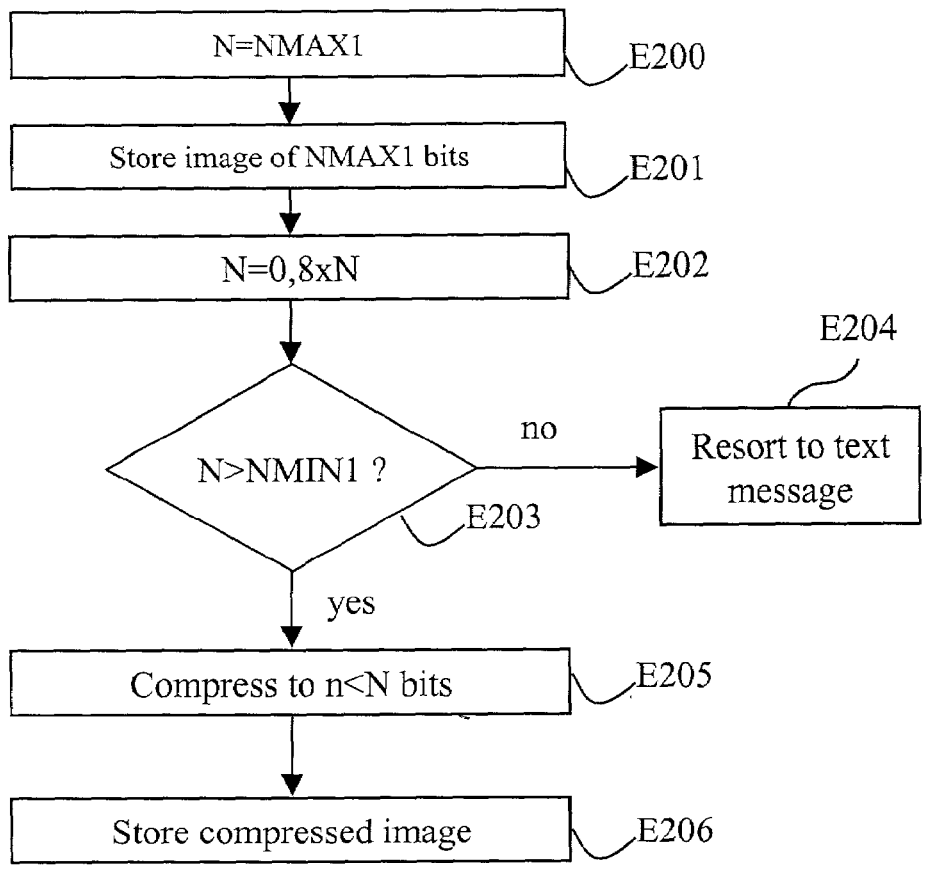
Figure 6C:
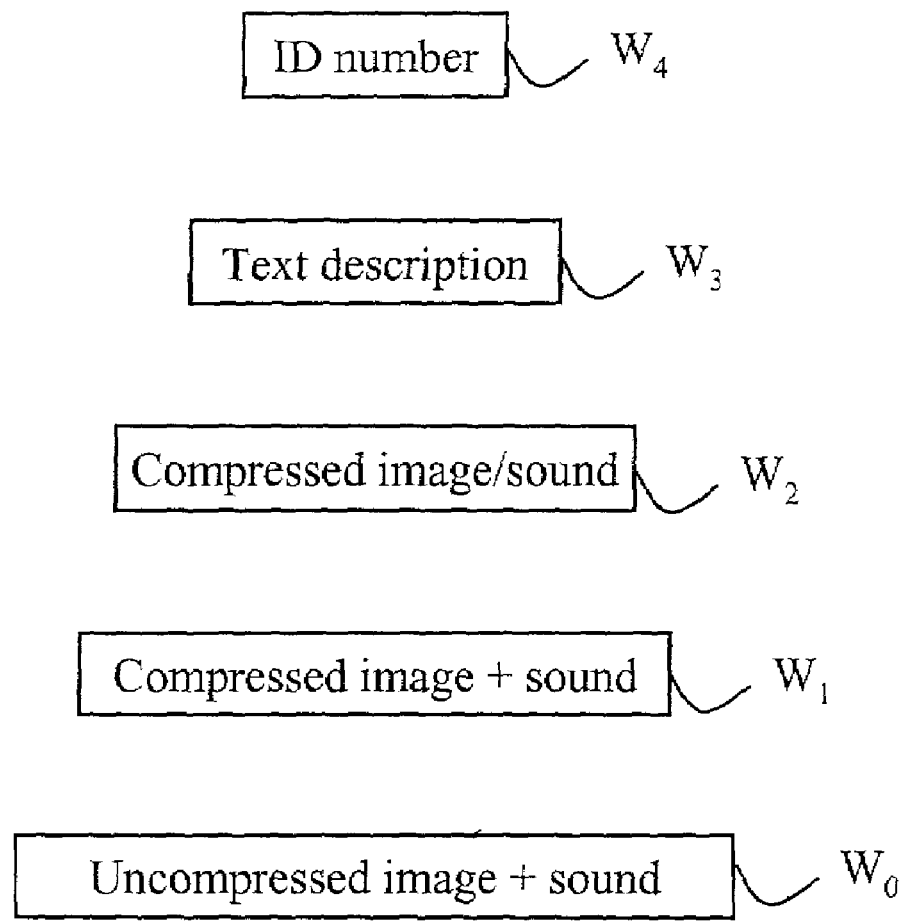
Figure 7:
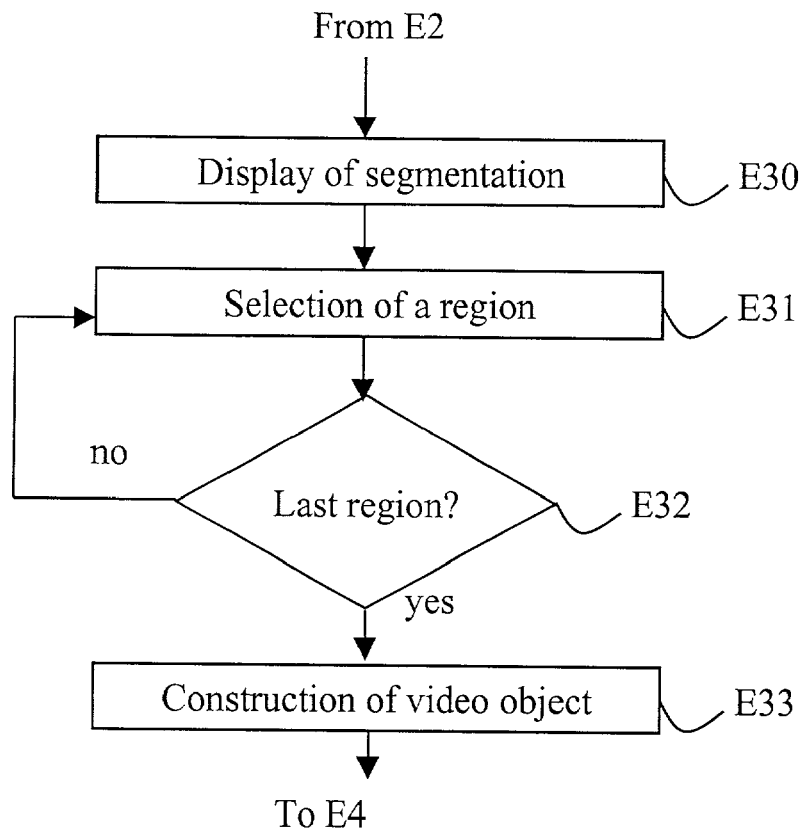
Figure 8:
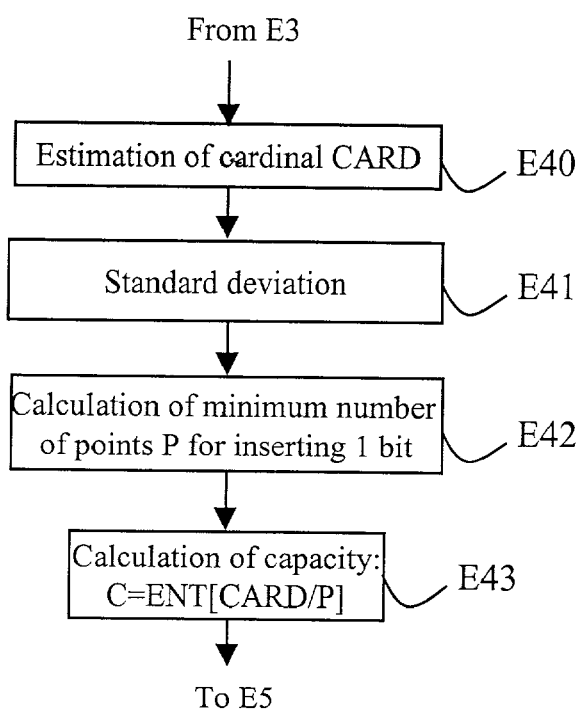
Figure 9:
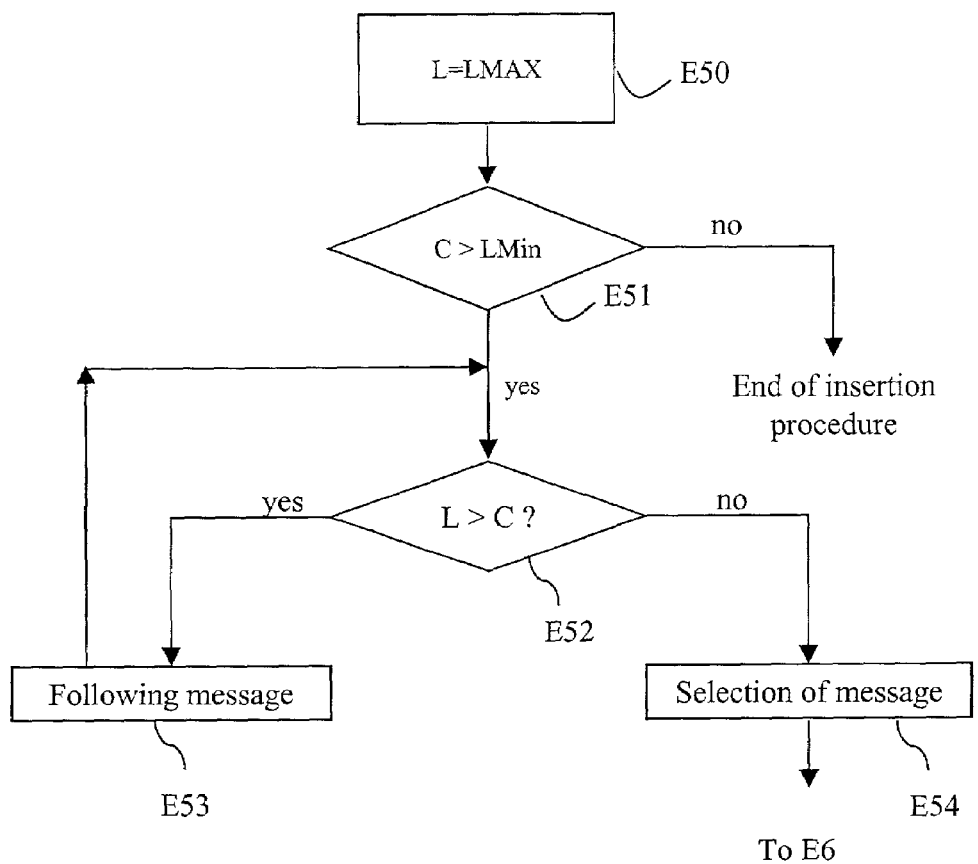
Figure 10:
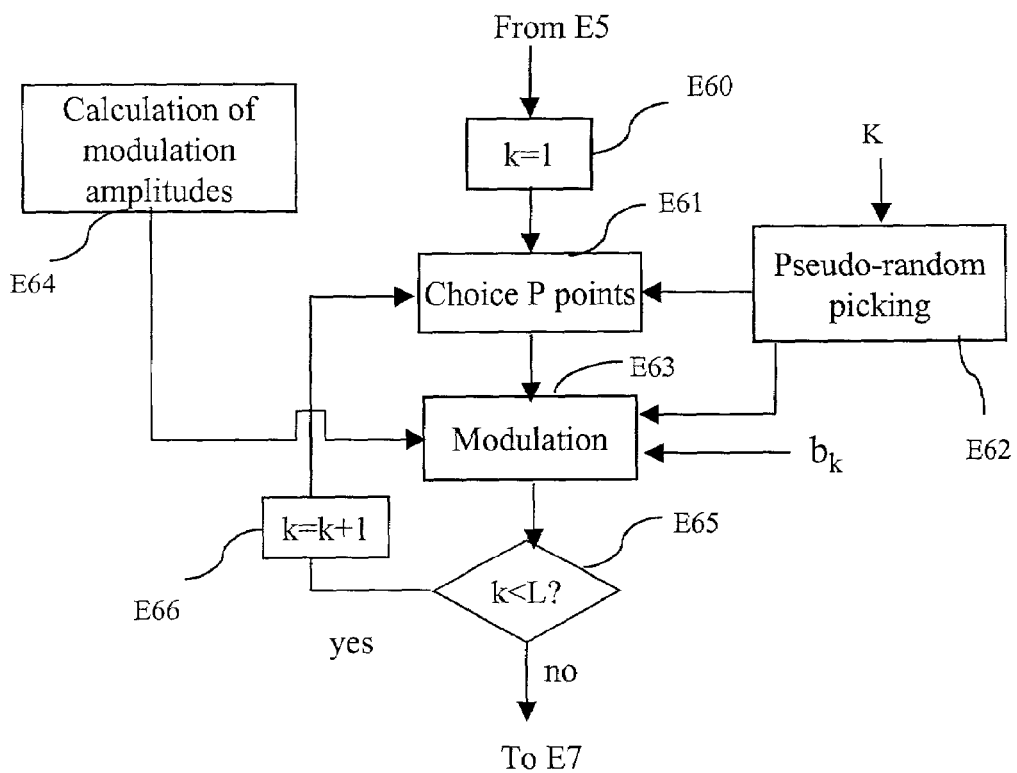
Figure 11:
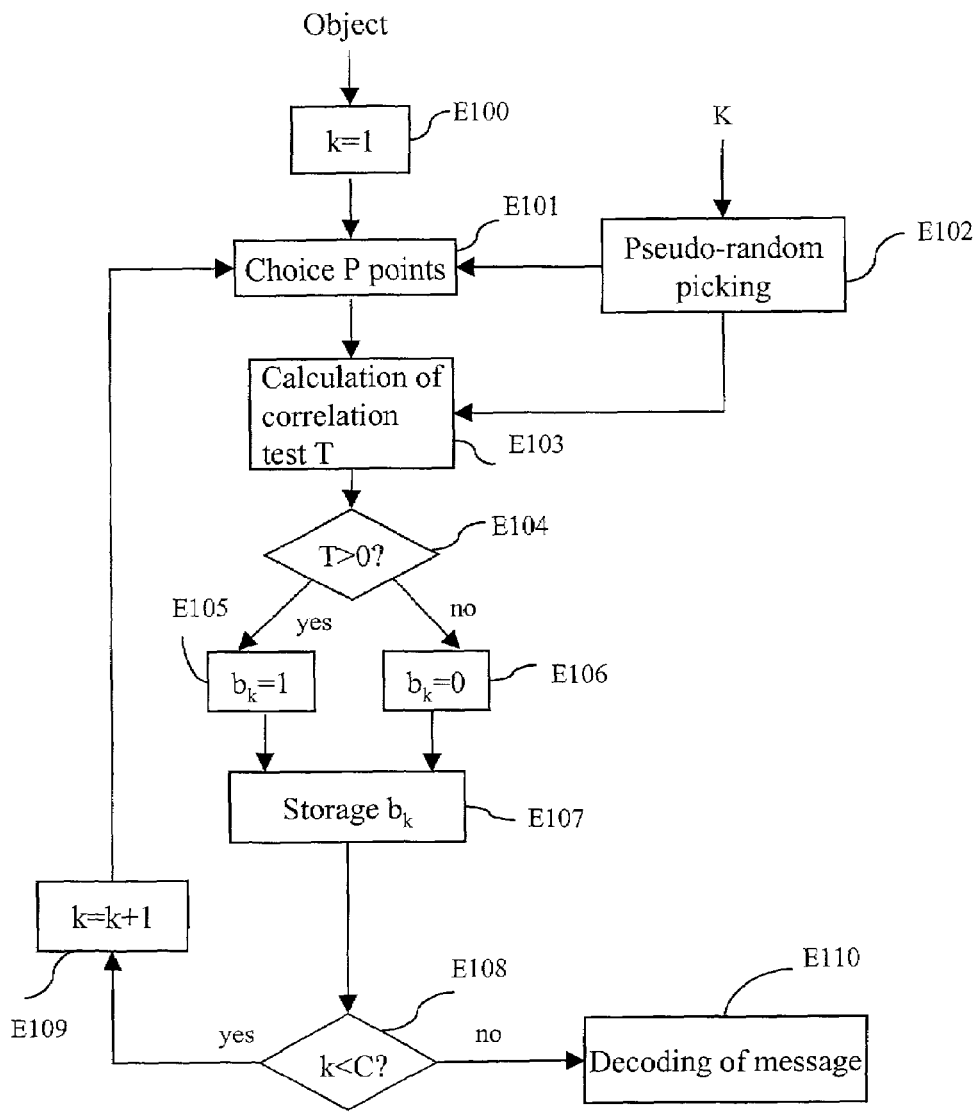
Figure 12:
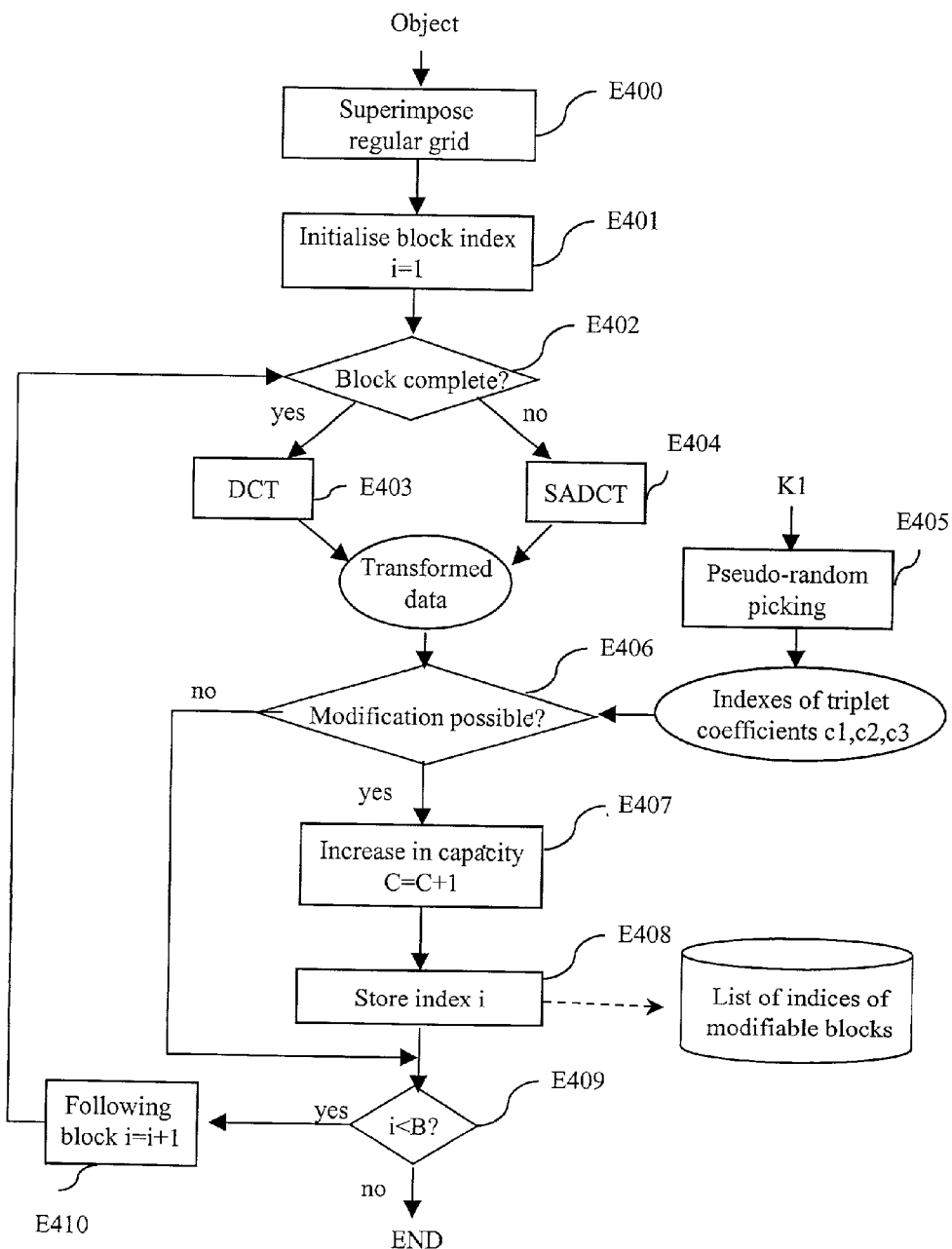
Figure 13:
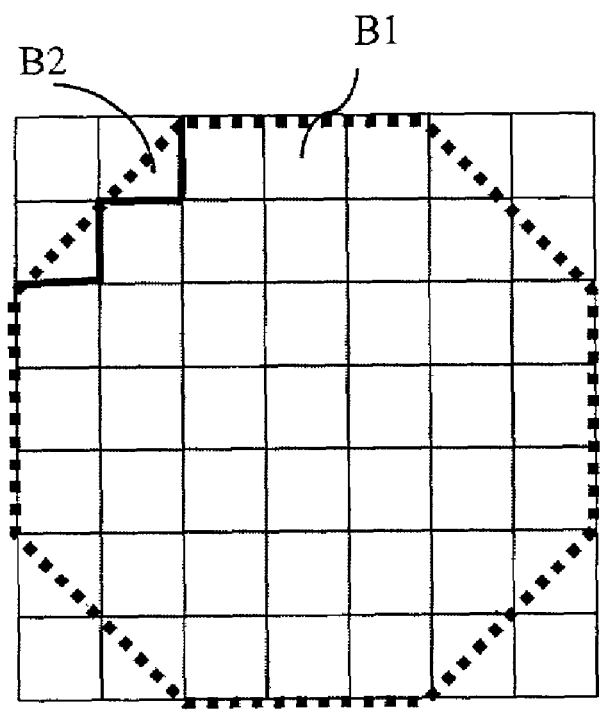
Figures 14, 15:
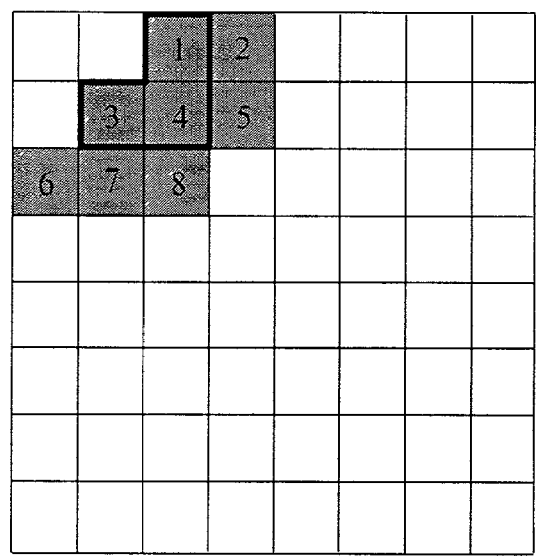
Figure 16:
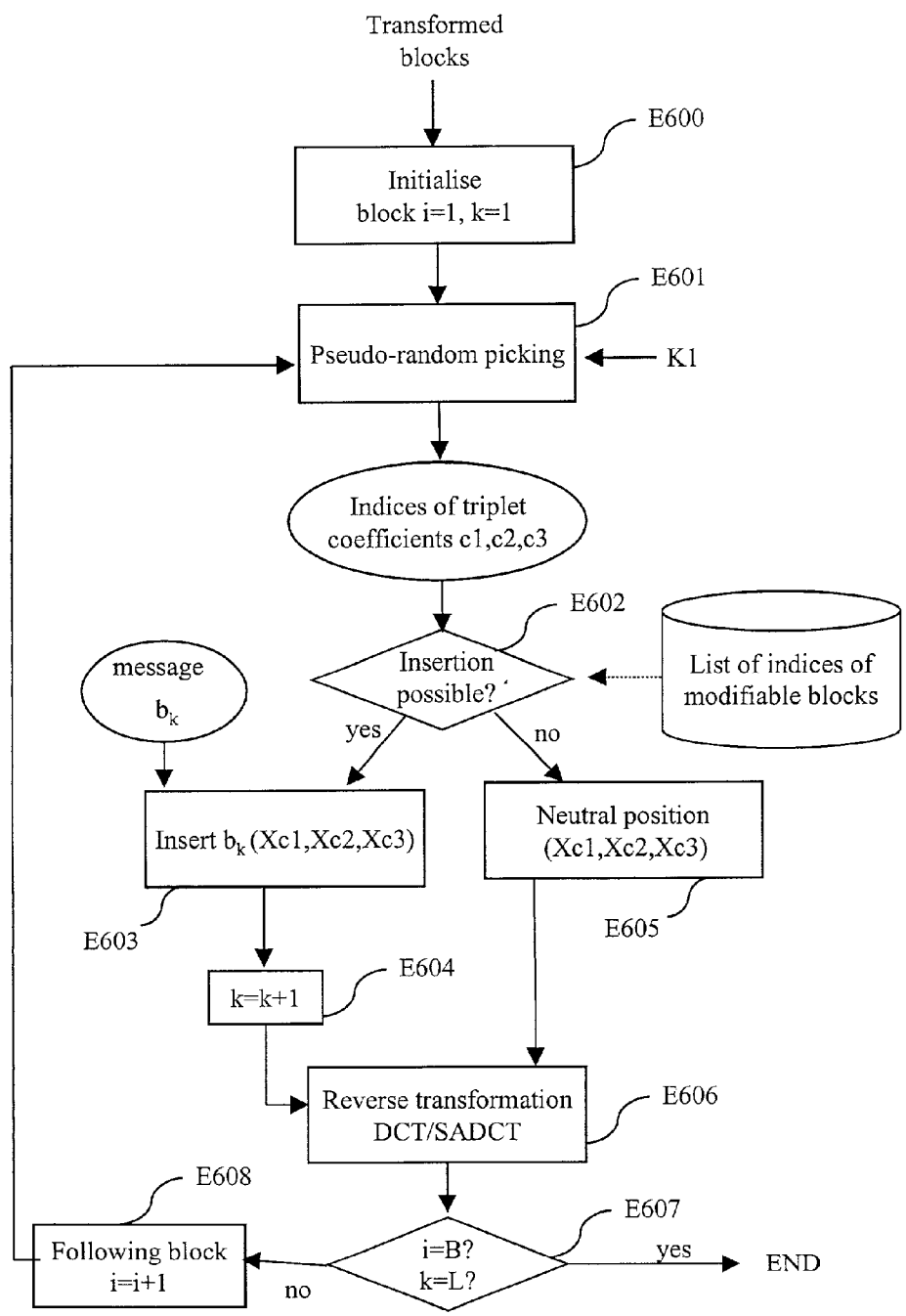
Figure 17:
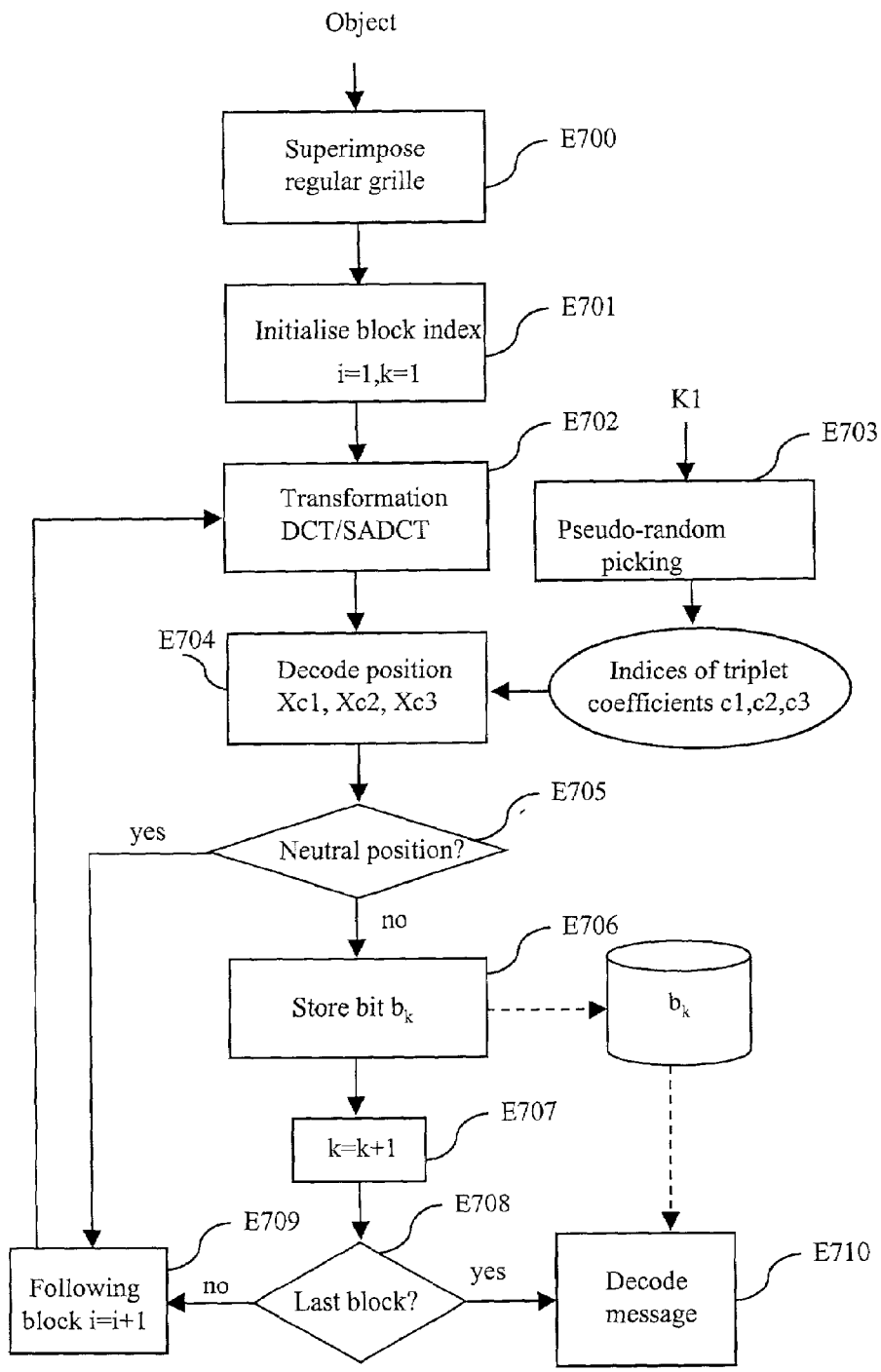

The characteristics and advantages of the present invention will appear more clearly from a reading of a preferred embodiment illustrated by the accompanying drawings, in which:

FIG. 1 depicts an embodiment of a device for inserting a message in data according to the invention, FIG. 2 depicts an embodiment of a device for extracting a message from data according to the invention, FIG. 3 depicts an embodiment of a device according to the invention, FIG. 4 depicts an embodiment of a method of inserting a message in data according to the invention, FIG. 5 is an embodiment of segmentation included in the method of FIG. 4, FIGS. 6a and 6b are embodiments of the construction of a set of messages included in the message of FIG. 4, FIG. 6c is an example of a set of messages to be inserted according to the invention, FIG. 7 is an embodiment of the selection of a video object included in the method of FIG. 4, FIG. 8 is a first embodiment of the calculation of capacity of a video object included in the method of FIG. 4, FIG. 9 is an embodiment of the selection of a message included in the method of FIG. 4, FIG. 10 is a first embodiment of the insertion of a message included in the method of FIG. 4, FIG. 11 is a first embodiment of the extraction of a message corresponding to the insertion of the previous figure, FIG. 12 is a second embodiment of the calculation of the capacity of a video object included in the method of FIG. 4, FIG. 13 depicts the formation of blocks in the video object, FIG. 14 depicts a transformed block, FIG. 15 illustrates a method of coding a bit to be inserted according to coefficients chosen in a transformed block, FIG. 16 is a second embodiment of the insertion of a message included in the method of FIG. 4, FIG. 17 is a second embodiment of the extraction of a message corresponding to the insertion of the previous figure.

With reference to FIG. 1, a device for inserting a message in digital data has a digital data segmentation circuit 1. The digital data are more particularly an image.

The circuit 1 is connected to a circuit 2 for constructing a video object VO from segmented data.

The circuit 2 is connected to a circuit 3 for estimating the capacity of the video object.

The circuit 3 is connected to a circuit 4 for selecting a message according to the previously determined capacity.

The messages are stored and are for example formed by a message forming circuit. As will be seen below, the messages have different sizes from each other, for example from 16 to 256 bits, as illustrated in FIG. 1.

The circuit 4 is connected to a circuit 5 for inserting the message in the video object. The circuit 2 is also connected to the insertion circuit 5.

The data thus processed are then supplied to a coder 6, which is capable of processing a digital object of arbitrary size and format. For example, the coder 6 is a coder of the MPEG4 type.

The functioning of the insertion device according to the invention will be detailed hereinafter.

FIG. 2 depicts an embodiment of a device for extracting a message inserted in data by the previously described device.

This device has a decoding circuit 7, corresponding to the coding circuit 6. According to the example chosen, the circuit 7 is an MPEG4 decoding circuit. The circuit 7 supplies a video object.

The circuit 7 is connected to a message extraction circuit 8, which processes the video object in order to extract therefrom a message previously inserted by the device of FIG. 1.

The functioning of the extraction device will be detailed hereinafter. It should be noted that the purpose of the extraction can be to find the inserted message, or to authenticate the digital data, in order to check whether they have undergone any alteration between the insertion of the message and its extraction.

As depicted in FIG. 3, a device implementing the invention is for example a microcomputer 10 connected to different peripherals, for example a digital camera 107 (or a scanner, or any image acquisition or storage means) connected to a graphics card and supplying information to be processed according to the invention.

The device 10 has a communication interface 112 connected to a network 113 able to transmit digital data to be processed or conversely to transmit data processed by the device. The device 10 also has a storage means 108 such as for example a hard disk. It also has a drive 109 for a disk 110. This disk 110 can be a diskette, a CD-ROM or a DVD-ROM for example. The disk 110, like the disk 108, can contain data processed according to the invention as well as the program or programs implementing the invention which, once read by the device 10, will be stored in the hard disk 108. According to a variant, the program enabling the device to implement the invention can be stored in read-only memory 102 (referred to as ROM in the drawing). In a second variant, the program can be received and stored in an identical fashion to that described previously by means of the communication network 113.

The device 10 is connected to a microphone 111. The data to be processed according to the invention will in this case be audio signal data.

This same device has a screen 104 for displaying the data to be processed or serving as an interface with the user, who can thus parameterize certain processing modes, by means of the keyboard 114 or any other means (a mouse 105 for example).

The central processing unit 100 (referred to as CPU in the drawing) executes the instructions relating to the implementation of the invention, the instructions being stored in the read only memory 102 or in the other storage elements. On powering up, the processing programs stored in a non-volatile memory, for example the ROM 102, are transferred into the random access memory RAM 103, which will then contain the executable code of the invention as well as registers for storing the variables necessary to the implementation of the invention.

In more general terms, an information storage means, which can be read by a computer or by a microprocessor, integrated or not into the device, and possibly removable, stores a program implementing the method according to the invention.

The communication bus 101 allows communication between the different elements included in the microcomputer 10 or connected to it. The representation of the bus 101 is not limiting and in particular the central unit 100 is able to communicate instructions to any element of the microcomputer 10 directly or by means of another element of the microcomputer 10.

The functioning of the watermarking insertion and watermarking extraction devices according to the invention will now be described by means of algorithms.

The algorithm of FIG. 4 depicts the general functioning of the insertion device according to the invention and includes steps E1 to E7.

This algorithm can be stored in whole or in part in any information storage means capable of co-operating with the microprocessor. This storage means can be read by a computer or by a microprocessor. This storage means is integrated or not into the device, and may be removable. For example, it may include a magnetic tape, a diskette or a CD-ROM (fixed-memory compact disc).

The method includes overall the construction of a video object, the calculation of the capacity of this video object, the selection of a message with a size less than the capacity and the insertion of the message in the video object.

Step E1 is a segmentation of the image. This step will be detailed below and results in a segmentation map associated with the image.

The following step E2 is the construction of the set of messages of different sizes. This step will be detailed below. Steps E1 and E2 can be reversed. In addition, step E2 can be replaced by a step of reading predefined and previously stored messages.

The following step E3 is the construction of a video object VO, which is a subset of the original image the subset having arbitrary size and form. This step will be detailed below.

The following step E4 is the calculation of the capacity of the previously determined video object. This step will be detailed below. It results in a capacity C expressed as a number of bits, which represents the maximum size of the message which can be inserted in the video object. For example, if the capacity is 40 bits, and if an alphanumeric character can be represented in 8 bits, then the message will have a maximum length of five characters.

The following step E5 is the selection of a message for sizes less than the capacity C of the video object. The message selected is that which has the largest size amongst the messages with a size less than the capacity C. Where there is no message with a size less than the capacity C, the processing is terminated. For example, a message warns the user of the interruption of the processing.

The following step E6 is the insertion of the message in the video object. This step will be detailed below.

Steps E3 to E6 are run through as many times as there are video objects to be processed.

Step E6 is followed by step E7, at which the image including at least one video object in which the message has been inserted is processed. This processing step must be capable of processing input data of arbitrary size and form. For example, the case of a coding of the MPEG4 type which receives as an input a binary mask of the form representing the object and the texture of the object.

A description will now be given, with reference to FIG. 5, of an embodiment of the segmentation of a digital signal such as an image, by means of a flow diagram including steps E90 to E92.

Step E90 is a simplification of the signal. A simplified version of the signal, more generally of an image, will for example be obtained by applying to the latter a morphological opening/closing operator, followed by a morphological reconstruction. A complete description of this method can be found in the article by Philippe Salembier entitled "Morphological multiscale segmentation for image coding" which appeared in the magazine "Signal Processing" number 38 of 1994. This type of processing eliminates the objects smaller than a certain size, and restores the contours of the objects which have not been eliminated. At the end of this step there is therefore a simplified version of the signal, which will be easier to process by means of the following steps.

The following step E91 is the labeling, or extraction of the labels, of the simplified signal. This step identifies the presence of the homogeneous regions of the simplified signal, using a criterion which can for example be a criterion of homogeneity of the intensity of the region (flat regions). Concretely, use is here made for example of a region growth algorithm: the signal is scanned in its entirety (for example from top to bottom and from right to left). A "kernel" is sought, that is to say a point, here a coefficient, representing a new region (the first coefficient of the signal will automatically be one of these). The characteristic of this region (mean value) is calculated on the basis of this point. Next all the neighbors of this point are then examined, and for each of the neighbors two possibilities are offered:

- if the point encountered has an intensity close to the mean value of the region in question, it is allocated to the current region, and the statistics of this region are updated according to this new element,
- if the point encountered has an intensity different (in the sense of a proximity criterion) from the mean value of the region, it is not allocated to the region (it may subsequently be considered to be a new "kernel" representing a new region).

All the neighbors allocated to the current region are then themselves subjected to examination, that is to say all their neighbors are examined (growth phase).

The processing of the region continues in this way until all points neighboring the points belonging to the region have been examined. At the end of this processing, the region is considered to be good or bad. If it is bad (typically, too small), it is the decision step which will process the points of the region in question. If it is good, the processing is terminated for it. A unique label or identifier is then allocated to all the points in the region. The global processing then continues with a search for a new kernel.

For a region to be considered good or bad, a parameter of minimum region size is used.

The following step E92 is the decision. It consists of attaching to a region all the points which do not have a label at the end of the labeling step E91 (typically, the points which have been attached to excessively small regions). This step can be performed simply by considering each of the points which do not have a label, and by allocating it to the neighboring region which it is closest to (in the sense of a proximity criterion).

Two embodiments of step E2 of constructing the set of messages are detailed with reference to FIGS. 6a and 6b. FIG. 6a represents an algorithm including steps E20 to E23. In this case, the message is a text.

Step E20 is an initialization at which a parameter N is initialized to a maximum value NMAX, for example equal to 256.

The parameter NMAX is an integer which represents the maximum message size. This size is here equal to 256 bits. The parameter N is an integer which represents a current message size. As will be seen, a constructed message can have a size less than the value of N.

The following step E21 is the entry of the current message by the user, for example by means of the keyboard 114. The user enters alphanumeric characters. The number of characters which it is possible to enter is limited by the current value of the parameter N. The message is stored in the memory 103.

At the following step E22, the parameter N is modified. The parameter N is for example divided by two.

The following step E23 is a test for determining whether the user wishes to enter a new message. It is also tested whether the current size is greater than a value NMIN, which is a minimum message size. For example, the value NMIN is equal to eight bits, which allows the coding of an alphanumeric character. If the response is positive at these two tests, then this step is followed by the previously described step E21.

If the response is negative at the step E23, then the construction of the message is terminated and this step is followed by step E3.

The result of step E2 is thus a set of messages stored by decreasing size.

FIG. 6b represents an algorithm including steps E200 to E206. In this embodiment, the initial message is an image. A compression algorithm is used to create smaller sets of data to fit the number of bits allowed at each step. When this number becomes too small to correspond to a compressed representation of the initial message, a text description or an identification number of the message in a database are used the represent the message.

Step E200 is an initialization at which a parameter N is initialized to a maximum value NMAX1. The parameter NMAX1 is an integer which is similar to the parameter NMAX of FIG. 6a.

The image is supposed to have a size less or equal to the parameter NMAX1. If this is not the case, the image is compressed. For example, the compression method described in "High performance image compression with EBCOT", D. Taubman, IEEE Trans. On Image Proc., vol. 9, n° 7, July 2001, pp 1158-1170 is used.

The following step E201 is the storage of the image in the memory 103.

At the following step E202, the parameter N is modified. The parameter N is for example multiplied by 0.8.

The following step E203 is a test for determining whether the current size N is greater than a value NMIN1, which is a threshold message size corresponding to the limit of acceptable quality for an image representation. For example, if the watermark image is a gray level image of 128×128 pixels, the threshold is equal to 4096 bits which corresponds to a compression rate of 0.25 bit per pixel. As a variant, the threshold is determined by a user.

If the response is negative at the step E203, then step E203 is followed by step E204 which goes to step E20 of FIG. 6a.

If the response is positive at the step E203, then this step is followed by step E205 at which the image is compressed by a compression method scalable in terms of bit-rate, for example by the same method as mentioned for step E201. This method allows to obtain a set of compressed representations of the image at targeted predetermined bit-rates.

The compressed image is memorized at the following step E206. This step is followed by step E202.

The result of step E2 is thus a set of messages stored by decreasing size.

FIG. 6c represents a set of watermarks. The watermarks include different types of information to represent the same initial message $W_0$. In this example, the initial message is an image associated with sound. This initial message has been compressed in order to form another message $W_1$ including image and sound and having a lower size than the message $W_0$.

This message $W_1$ has been compressed in order to form another message $W_2$ including image and sound and having a lower size than the message $W_1$.

A message $W_3$ including a text has been formed from the message $W_2$ and a message $W_4$ includes an identification number relating to the messages $W_0$ to $W_3$.

The step E3 of constructing a video object is detailed with reference to FIG. 7 in the form of an algorithm including steps E30 to E33. The principle is here to construct an object by merging several regions selected by a user.

Step E30 is a display on the screen 104 of the segmentation which results from step E1.

The following step E31 is the selection of a region of the segmentation. This selection is made by the user, for example by clicking on the region by means of the mouse. The selected region is stored in memory.

The following step E32 is a test for determining whether the current region is the last of the object currently being constructed or whether the user wishes to add at least one other region.

If the current region is not the last of the object currently being constructed, then step E32 is followed by the previously described step E31.

Otherwise, when all the regions have been selected, step E32 is followed by step E33, at which the video object is constructed by concatenation of all the selected regions.

The result of step E33 is thus a video object consisting of one or more regions.

A first embodiment of the invention is considered. In this first embodiment, the step E4 of calculating the capacity of a video object is detailed with reference to FIG. 8, in the form of an algorithm which includes steps E40 to E43.

Step E40 is the estimation of the cardinal CARD of the relevant video object VO, that is to say the number of coefficients in this object.

The following step E41 is the calculation of the standard deviation of the coefficients of the video object in question.

The following step E42 is the calculation of the minimum number P of coefficients necessary for inserting a bit so as to be able to detect a bit with a predetermined correct probability of detection.

In this embodiment, the insertion of an information bit is effected by modulating a low-amplitude pseudo-random signal on certain coefficients. The detection of the watermarking signal is a statistical detection, in particular a hypothesis test.

In this context, it is known, for example from the document EP-1 043 687, that the standard deviation of the set of modulated coefficients and the probability of detection of the inserted signal are linked.

The number P is associated with the object, and is for example written in an information field in the file coded according to the MPEG4 format.

The following step E43 is the calculation of the capacity C of the video object, by means of the formula: C=ENT (CARD/P), where ENT( . . . ) denotes the integer part.

The step E5 of selecting the message to be inserted in the video object is detailed with reference to FIG. 9 in the form of an algorithm including steps E50 to E54.

Step E50 is an initialization at which the longest message is considered. For this purpose, the parameter L is initialized to the value LMAX. The value LMAX is an integer which represents the size of the longest message. The value LMAX is less than or equal to the value NMAX.

The parameter L is an integer which represents the current message size.

The following step E51 is a test for checking whether the capacity C is greater than the smallest message size LMIN. if the response is negative, then insertion is impossible and the processing is interrupted.

If the response is positive at step E51, then this step is followed by step E52, which is a test for determining whether the current value of the parameter L is greater than the capacity C of the video object currently being processed.

If the response is positive, then this means that the current message cannot be inserted in the video object in question. Step E52 is then followed by step E53, at which a message of smaller size is considered. The messages are considered in decreasing order of size.

Step E53 is followed by the previously described step E52.

If the response is negative at step E52, then this step is followed by step E54, which is the selection of the message for a size which is immediately below the capacity C.

Step E54 is followed by the step E6 of inserting the length message L, a first embodiment of which is now detailed with reference to FIG. 10, in the form of an algorithm including steps E60 to E66.

Step E60 is an initialization at which an integer parameter k is set to one in order to consider a first bit to be inserted $b_k$.

The following step E61 is the selection of P coefficients $C_j$ in the video object, with j being an integer varying between 1 and P. Note that the number P was determined at step E42. This selection is made by pseudo-random picking or deterministically. For a pseudo-random picking, the following procedure is for example followed. The points on the video object are run through in the video scanning order. For each point, a pseudo-random binary picking is effected. The point is adopted for the modulation if the binary value is equal to one. This pseudo-random picking is repeated on as many points on the object as necessary in order to obtain the required number P of points adopted for modulation.

Step E62 is a pseudo-random picking carried out using a secret key K. The result of the pseudo-random picking is a pseudo-random signal W containing a number P of coefficients $w_i$ equal to the number P of previously selected coefficients. For example, the coefficients $w_i$ are equal to +1 or −1.

Step E63 is a modulation of the watermarking bit $b_k$ on the values of P coefficients in order to supply watermarked coefficients $C'_j$. This modulation is effected according to the formula:

$$C'_j = C_j + s_k \cdot \alpha_i \cdot w_i.$$

In this formula, the parameter $\alpha_i$ is an integer which denotes a modulation amplitude which can be chosen in different ways. For example, a set of maximum amplitudes corresponding to each coefficient of the video object processed is calculated at step E64. For this purpose, psycho-visual masking rules are used, which make it possible to predict the visibility of the modification of a coefficient according to the spectral content of its vicinity.

The parameter $\alpha_i$ can also be a predetermined value which is constant for each coefficient. In this case, it is chosen so as to be relatively low.

In the previous formula, the parameter $s_k$ is equal to +1 if the inserted bit $b_k$ is equal to one and is equal to −1 if the inserted bit $b_k$ is equal to zero.

The following step E65 is a test for determining whether there remains at least one bit to be inserted. If the response is positive, then this step is followed by step E66, at which the parameter k is incremented by one unit in order to consider the following bit to be inserted. Step E66 is followed by the previously described step E61.

If the response is negative at step E66, then the insertion is terminated and this step is followed by step E7.

A first embodiment of extraction of the message is described with reference to FIG. 11 in the form of an algorithm including steps E100 to E110.

The object VO, in which the message was inserted, is worked on here. It should be noted that this object is defined by its texture and a mask.

Step E100 is an initialization at which the parameter k is set to one in order to consider a first bit to be extracted from the video object.

The following step E101 is a selection of P coefficients in the video object. This step is similar to the previously described step E61.

Step E102 is a pseudo-random picking, similar to the previously described step E62.

The following step E103 is a calculation of a measurement of correlation T between the values of the P coefficients selected and the pseudo-random signal determined at step E102.

The following step E104 is a test for determining whether the previously calculated correlation measurement T is strictly positive. If the response is positive, then step E104 is followed by step E105, at which the value "one" is allocated to the current extracted bit $b_k$.

If the response is negative at step E104, then this step is followed by step E106, at which the value "zero" is allocated to the current extracted bit $b_k$.

Steps E105 and E106 are followed by step E107, at which the value of the extracted bit $b_k$ is stored in memory.

The following step E108 is a test for determining whether there remains at least one bit to be extracted. The test is carried out by comparing the number k of extracted bits with the capacity C. The capacity C is known from the number P, in a similar manner to step E43. Where the message has a length which is less than the capacity C, bits without signification will be extracted. Then only the coherent part of the message will be kept after its decoding (step E110).

If the response is positive, then this step is followed by step E109, at which the parameter k is incremented by one unit in order to consider a following bit to be extracted.

Step E109 is followed by the previously described step E101.

When the response is negative at step E108, then this step is followed by step E110, which is the decoding of the message. The C bits previously decoded are transformed into a set of characters. For example, in the case of ASCII,if each character is coded in eight bits, then the decoding of the message consists of replacing each group of eight bits with the corresponding character.

As a variant, the messages can be known at the time of the extraction of a message from a video object. In this case, the decoding includes the identification of one of the known messages. More particularly, several sets of messages are stored, each being associated with a specific meaning. The fact that the extracted message belongs to one of the sets of stored messages is identified.

In a second embodiment, a processing of data by blocks is considered, to which a spectral transformation is applied.

FIG. 12 depicts the estimation of capacity according to this embodiment of the invention. The estimation of the capacity includes steps E400 to E410.

Step E400 is the superimposition of a regular grid on the video object processed so as to define blocks in this object. As depicted in FIG. 13, the grid is for example formed by square blocks of predetermined size. Some blocks, like the block B1, are entirely within the object, whilst others, like block B2, overlap the edges of the object.

The following step E401 is an initialization for considering a first block to be processed. A parameter i is set to one. The parameter i represents a current block.

The following step E402 is a test for determining whether the current block is complete, that is to say entirely within the object or not.

If the response is positive, this step is followed by step E403, at which the block in question is transformed by a transformation of the DCT type (DCT from 'Discrete Cosine Transform').

If the response is negative at step E402, then this step is followed by step E404, at which the block in question is transformed by a transformation of the SADCT type (SADCT from 'Shape Adaptative Discrete Cosine Transform'). This type of transformation is an adaptation of the DCT transformation to forms of arbitrary shape. It is described in the article "Low complexity shape-adaptive DCT for coding of arbitrarily shaped image segments" in Signal Processing: Image Communication, vol. 7, 1995.

Step E405 is a pseudo-random picking carried out using a secret key K1 in order to determine one or more triplets of coefficients in the current transformed block. Hereinafter, in order to simplify the description, we will consider that only one triplet is chosen in each transformed block.

FIG. 14 depicts a block transformed by a DCT transformation. The block has 8×8 coefficients. The coefficient with the lowest frequency is situated at the top left and the other coefficients are arranged by increasing frequency going towards the opposite corner at bottom right.

The coefficients are selected in the medium frequency since it has been shown experimentally that this offers better effectiveness with regard to the robustness/visibility ratio.

A triplet of modifiable coefficients is selected and represented by the indices C1, C2 and C3. These indices are chosen amongst the indices numbered from 1 to 8 in FIG. 14.

The following step E406 is a test for determining whether the triplet of coefficients is modifiable. A triplet of coefficients is modifiable if a modification thereof does not give rise to an excessively high distortion, for example measured by a threshold. The modification which is envisaged here modifies the relative value of one or more coefficients in the triplet, so as to code an information bit.

FIG. 15 depicts the coding of an information bit according to the relative value of the coefficients in the triplet in question.

The coefficients of the triplet are ordered and the absolute values of the coefficients of the triplet are considered. The symbol H represents the highest absolute value, the symbol M the intermediate absolute value and the symbol L the lowest absolute value.

For example, if the value of a coefficient is denoted X, the first line in the table corresponds to the case where:

$|X_{C1}|>|X_{C2}|>|X_{C3}|$

This case corresponds to the coding of a "one".

All the possible states are divided into three categories: coding of a "one", coding of a "zero", or neutral.

A neutral case corresponds to a case where the modification of the amplitude of the coefficients in order to code an information bit would introduce a visible distortion.

If the response is positive at step E406, then this step is followed by step E407, at which the capacity of the video object is increased by one. Where several triplets are chosen in the same block, then the capacity is increased by the number of modifiable triplets.

The following step E408 is the storage of the index of the current block in a list of indices of modifiable blocks.

If the response is negative at step E406, then this step is followed by step E409. Likewise, step E408 is followed by step E409.

Step E409 is a test for determining whether all the blocks have been processed. If the response is negative, this step is followed by step E410, at which a following block is considered. This step is followed by the previously described step E402.

When all the blocks have been processed, then the capacity of the video object is determined.

FIG. 16 depicts the insertion of the message in the video object, according to the second embodiment, in the form of an algorithm including steps E600 to E608.

Step E600 is an initialization at which an integer parameter k is set to one in order to consider a first bit to be inserted $b_k$. A parameter i is also set to one in order to consider a first transformed block in the video object.

The following step E601 is a pseudo-random picking carried out using the secret key K1 in order to select one or more possible triplets for the current block. This step is similar to the previously described step E405. To simplify the description, there too only one triplet per block is considered.

The following step E602 is a test for determining whether insertion is possible. The test is based on an acceptable distortion threshold. Alternatively, it is possible to use the list of modifiable blocks previously determined (step E408).

If the response is positive at step E602, then this step is followed by step E603, which is the insertion of the bit $b_k$. For this, if the coding value of the triplet (FIG. 15) is equal to the value of the bit $b_k$, the triplet is not modified. In the opposite case, the values of the triplet coefficients are modified so that this triplet represents the bit $b_k$.

Step E603 is followed by step E604, at which the parameter k is incremented by one unit in order to consider a following bit to be inserted.

If the response is negative at step E602, then this step is followed by step E605, at which the triplet is put in a neutral state (FIG. 15).

Steps E604 and E605 are followed by step E606, at which an inverse DCT or SADCT transformation of the current block is carried out.

The following step E607 is a test for determining whether all the bits of the message have been inserted or whether all the blocks have been processed. If the response is positive at one of these two tests, then the processing is terminated.

Otherwise step E607 is followed by step E608, at which the parameter i is incremented by one unit, in order to consider a following block.

Step E608 is followed by the previously described step E601.

FIG. 17 depicts the extraction of the message according to the second embodiment, in the form of an algorithm including steps E700 to E710.

Step E700 is the superimposition of a regular grid on the video object processed so as to define blocks in this object. This step is similar to step E400.

The following step E701 is an initialization at which the parameter i is set to one in order to consider a first block to be processed, and the parameter k is set to one in order to consider a first bit to be extracted.

The following step E702 is a transformation of the current block. This step is similar to step E403 or E404, depending on whether or not the block is complete.

Step E703 is a pseudo-random picking carried out using the secret key K1. This step is similar to the previously described step E405. It results in a triplet of coefficients.

Step E704 is a decoding which consists of deducing a binary or neutral value from the relative values of the coefficients of the triplet (FIG. 15).

Step E704 is followed by step E705, which is a test for determining whether the previously determined value is neutral.

If the response is negative, then this step is followed by step E706, at which the value of the extracted bit $b_k$ is stored in memory.

At the following step E707, the parameter k is incremented by one unit in order to consider a following bit to be extracted.

The following step E708 is a test for determining whether the current block is the last block to be processed. If the response is negative, then this step is followed by step E709, at which the parameter i is incremented by one unit in order to consider a following block.

If the response is positive at step E705, then this step is followed by step E709. Step E709 is followed by the previously described step E702.

When the response is positive at step E708, then this step is followed by step E710, which is the decoding of the message. This step is similar to the previously described step E110.

Naturally, the present invention is in no way limited to the embodiments described and depicted, but quite the contrary encompasses any variant within the capability of a person skilled in the art.

The invention claimed is:

1. A method of inserting a message in a subset of digital data representing physical quantities, characterised in that the method includes the steps of:
    a) estimating a capacity to receive a message for said subset,
    b) comparing to the estimated capacity a size of a message among a set of messages representing a same message with each having a different number of bits,
    c) selecting, from said set of messages, the compared message if said compared message has a size less than or equal to the estimated capacity, and
    d) inserting the selected message in the said subset of digital data.

2. The insertion method according to claim 1, characterised in that it includes a prior step of producing the set of messages, and said set includes messages having different sizes.

3. The insertion method according to claim 1, characterised in that each message in the set that is of a size that is not the largest in the set is deducible from another message with a larger size that is included in the set of messages.

4. The insertion method according to claim 1, characterised in that the message is selected so that its size is just less than or equal to the estimated capacity for said subset of digital data.

5. The insertion method according to claim 1, characterised in that said subset of digital data has an arbitrary shape.

6. The insertion method according to claim 1, characterised in that said subset of digital data corresponds to an object characterizing a semantic entity of the set of digital data.

7. The insertion method according to claim 1, characterised in that it also includes the prior steps of:
    segmenting the digital data into regions, and
    selecting at least one region in order to constitute said subset.

8. The insertion method according to claim 1, characterised in that step (c) includes, for each element of the message, the choice of coefficients in said subset and the modulation of the element on the values of the chosen coefficients.

9. The insertion method according to any one of claims 1 to 8, characterised in that step (a) includes the calculating of the minimum number of coefficients necessary for inserting a message element so as to be able to detect this element with a predetermined correct detection probability.

10. The insertion method according to claim 1, characterised in that it includes steps of:
    segmenting the subset into blocks and
    transforming the blocks by means of a reversible transformation, prior to step (c),
    and wherein step (c) includes the steps of:
        selecting a group of coefficients in a transformed block, for an element of the message to be inserted, and
        coding the element to be inserted according to the relative values of the coefficients of the selected group.

11. The insertion method according to claim 1, characterised in that step (a) includes searching for the number of usable groups according to a predetermined rule.

12. A computer program on a storage medium and comprising computer executable instruction for causing a computer to insert a message in a subset of digital data representing physical quantities according to the insertion method of claim 11.

13. A digital signal processing apparatus, characterised in that it comprises means adapted to implement the insertion method of claim 1.

14. A storage medium storing a program for implementing the insertion method of claim 1.

15. The storage medium according to claim 14, characterised in that said storage medium is detachably mountable on an insertion device according to claim 21.

16. The storage medium according to claim 14 or 15, characterised in that said storage medium is a floppy disk or a CD-ROM.

17. A method of extracting a message from a subset of digital data representing physical quantities, characterised in that it includes steps of:
    extracting the message,
    comparing the extracted message with messages stored in memory, and
    identifying the fact that the extracted message belongs to a set of stored messages representing a same message with each having a different number of bits.

18. A computer program on a storage medium and comprising computer executable instructions for causing a computer to extract a message inserted in a subset of digital data representing physical quantities according to the extracting method of claim 17.

19. A device for extracting a message from a subset of digital data representing physical quantities, characterised in that the device for extracting comprises:
    means for extracting the message,
    means for comparing the extracted message with messages stored in memory and
    means for identifying the fact that the extracted message belongs to a set of stored messages representing a same message with each having different number of bits.

20. The extraction device according to claim 19, characterised in that the extraction, comparison and identification means are incorporated in:
    a microprocessor,
    a read-only memory containing a program for processing the data, and
    a random access memory containing registers adapted to record variables modified during the running of said program.

21. A device for inserting a message in a subset of digital data representing physical quantities, characterised in that it comprises:
    means for estimating a capacity to receive a message for said subset,
    means for comparing to the estimated capacity a size of a message among a set of messages representing a same message with each having a different number of bits,
    means for selecting, from said set of messages, the compared message if said compared message has a size less than or equal to the estimated capacity, in a set of messages, and
    means for inserting the selected message in the said subset of digital data.

22. The insertion device according to claim 21, characterised in that it also comprises means for producing the set of messages, and said set includes messages having different sizes.

23. The insertion device according to claim 22, characterised in that the means for producing is adapted to form each message with a size that is not the largest in the set of messages so as to be deducible from another message with a greater size and included in the set of messages.

24. The insertion device according to claim 21, characterised in that the means for selecting is adapted to select the message so that its size is just less than or equal to the estimated capacity for said subset of digital data.

25. The insertion device according to claim 21, characterised in that it is adapted to consider a subset of digital data that is arbitrary in shape.

26. The insertion device according to claim 21, characterised in that it is adapted to consider a subset of digital data that corresponds to an object characterizing a semantic entity of the set of digital data.

27. The insertion device according to claim 21, characterised in that it also comprises:
    means for segmenting the digital data into regions and
    means for selecting at least one region in order to constitute said subset.

28. The insertion device according to claim 21, characterised in that the means for inserting the selected message is adapted to make, for each element of the message, the choice of coefficients in said subset and the modulation of the element on the values of the chosen coefficients.

29. The insertion device according to claim 21, characterized in that the means for estimating a capacity is adapted to calculate the minimum number of coefficients necessary for inserting a message element so as to be able to detect this element with a predetermined correct detection probability.

30. The insertion device according to claim 21, characterized in that it also comprises:
    means for segmenting the subset into blocks and
    means for transforming the block by means of a reversible transformation, prior to the insertion step,
    and wherein the means for inserting the selected message comprises:
        means for selecting a group of coefficients in a transformed block, for an element of the message to be inserted, and
        means for coding the element to be inserted according to the relative values of the coefficients of the selected group.

31. The insertion device according to claim 21, characterised in that the means for estimating a capacity is adapted to seek the number of groups that can be used according to a predetermined rule.

32. The insertion device according to any one of claim 21 to 31, characterised in that the estimation, selection and insertion means are incorporated in:
    a microprocessor,
    a read-only memory containing a program for processing the data, and
    a random access memory containing registers adapted to record variables modified during the running of said program.

33. A digital signal processing apparatus, characterised in that it comprises the insertion device of claim 21.

* * * * *